J. W. COLLADAY.
Corn-Planter.

No. 223,483.  Patented Jan. 13, 1880.

Attests
Robt. A. Cavin
Joel Zane Jr.

Inventor
Jacob W. Colladay
By his atty

2 Sheets—Sheet 2.

J. W. COLLADAY.
Corn-Planter.

No. 223,483. Patented Jan. 13, 1880.

Attests
Robt. Marvin
Gordon Seckel

Inventor
Jacob W. Colladay
By his atty

UNITED STATES PATENT OFFICE.

JACOB W. COLLADAY, OF DECATUR, ILLINOIS.

CORN-PLANTER.

SPECIFICATION forming part of Letters Patent No. 223,483, dated January 13, 1880.

Application filed November 17, 1879.

*To all whom it may concern:*

Be it known that I, JACOB W. COLLADAY, of the city of Decatur, in the county of Macon and State of Illinois, have invented an Improvement in Corn-Planters, of which the following is a specification.

My invention relates to corn-planters designed to drop the corn without the use of the check-row cord; and it consists, first, in the mechanism whereby a regular drop of corn is obtained and governed, even when one wheel is in a hollow and the other is not; secondly, in the mechanism whereby the reciprocating bar is caused to rotate the disks in the seed-hoppers; thirdly, in the mechanism whereby the reciprocating bar is thrown in and out of action; fourthly, in the mechanism whereby the throw of the reciprocating bar can be regulated.

The object of my invention is to construct a corn-planter so that the regularity of the drop shall be perfect whether or not the ground is level, and without the use of the usual check-row cord.

Figure 1:
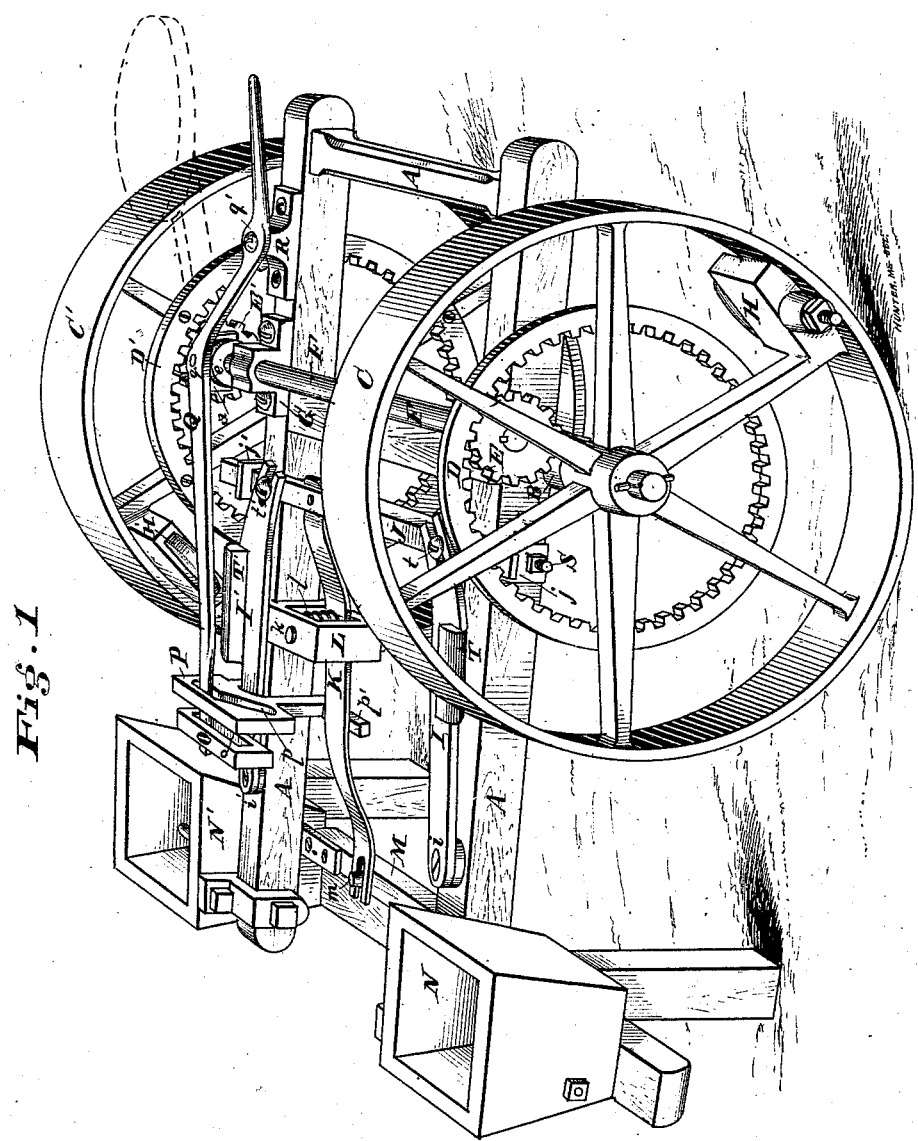
Figure 2:
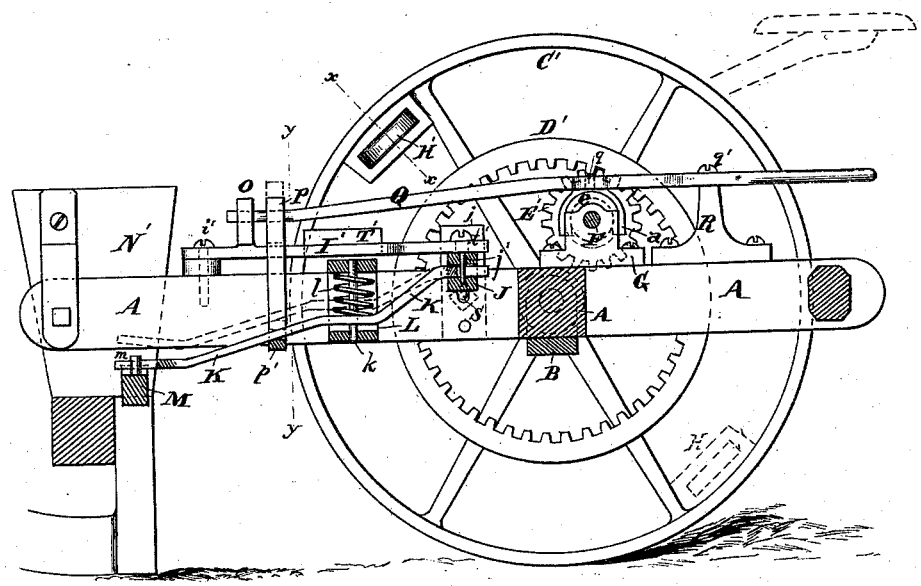
Figure 3:
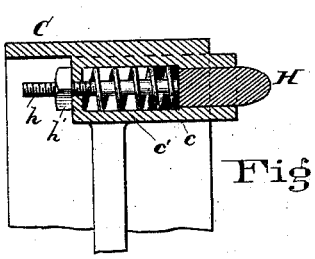
Figure 4:
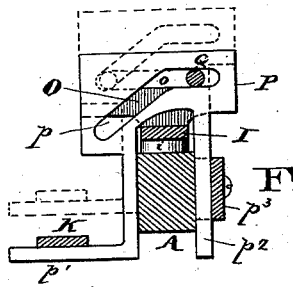
Figure 5:
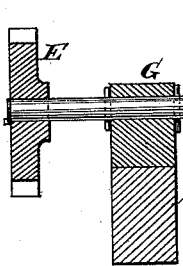
Figure 6:
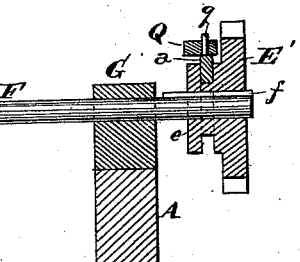

In the drawings, Figure 1 is a perspective view of my improved corn-planter. Fig. 2 is a longitudinal sectional elevation of the same. Fig. 3 is a section, through the line $x\,x$, of the hammer which strikes the dogs, by which action the reciprocating bar is moved. Fig. 4 is a cross-section through $y\,y$ of the mechanism which throws the reciprocating bar in and out of action. Fig. 5 is a sectional elevation of the shaft carrying the pinions which mesh with the driving-wheels. Fig. 6 is a section of the mechanism which regulates the throw of the reciprocating bar.

A A is the frame of the machine. Secured to the bottom of the frame is the crank-axle B, upon which the wheels C C' revolve. Secured to the spokes of the wheels C C' are gear-rings D D'. Situated over the frame A is a shaft, F, which has bearings in boxes G G, and carries upon one end a fixed pinion, E, and upon the other a loose pinion, E', which has a grooved hub, $e$. This pinion E' slides upon the shaft F, and is prevented from turning by the feather $f$. Fitting into the groove on the hub $e$ is a collar, $a$, with a pin at the top, which fits into a hole in the lever Q.

Secured to the frame A, and pivoted at $i\,i'$, are the dogs I I', which impart motion to the bar J by the pins $t\,t$, which pass through slots in the dogs. The bar J slides in bearings $j\,j'$, which are secured to the frame of the machine. The dogs have striking-pieces T T', cast or formed with them.

Near the fulcrum of and on the dog I' is a piece, O, which is furnished with a horizontal slot, $o$. Situated immediately in the rear of the piece O is a piece, P, furnished with a cam-slot, $p$, and two legs, which straddle the dog I' and one of the frame-timbers A. The leg $p^2$ slides in a plate, $p^3$, which guides the movement of the piece P. Upon the other leg is an arm, $p'$, which passes under the lever K. The lever Q is pivoted at $g'$ upon the standard R, which is secured to the frame A. The front end of this lever plays through the slots $p$ and $o$, of which the slot $o$ never allows it to change its level with reference to the machine.

At the periphery of the wheels C C' are hammers H H', which strike the dogs I I'. These hammers H slide in boxes $c$, and are furnished at their back with a strong coil-spring, $c'$, and their inward projection from the wheel is governed by the screw-threaded pin $h$ and nut $h'$.

When the machine is planting, the two hammers H and H' must be set exactly opposite each other, and then the pinion E' be thrown into gear with the ring-gear D'.

Secured to the frame, to the left of the dog I', is an open casting, L, through which there is a pin, $k$. Upon this pin, as a fulcrum, the lever K oscillates, and is kept down by the spring $l$. The rear end of the lever K is slotted and passes through a slot in the box J, and is held from lateral movement by the pin $j'$, which passes through the slot. The other or forward end of the lever K is also slotted, which slot incloses a pin, $m$, on the reciprocating bar M, which rotates the seed-disks in the hoppers N N'. Secured to either side of the bar J is a bolt, S, which is furnished with a nut, $s$, and passes through a hole in the frame A, Fig. 6.

The object of this construction is to regulate the throws of the bar J, and consequently the reciprocating bar M.

On one or both of the wheels C C', and on the inside of the flange, directly opposite the hammers H and H', there are small knobs or some noticeable mark, for the purpose of setting the two hammers H H' directly opposite each other before the two wheels C C' are thrown into gear by the shaft F and pinions E and E', for the purpose of making the bar M reciprocate at regular intervals.

In operation, the machine works as follows: The pinion E' being thrown out of contact with the gear D' by the lever Q, the wheels C C' are rotated upon their axes until the two hammers H H' are exactly opposite each other; then the pinion E' is thrown back again, and the two wheels C C' are geared together and cannot rotate upon their axes independently of each other. As the machine moves forward, the hammer H' strikes the part T' on the dog I' and throws it to the left, causing a corresponding motion to be imparted to the bar J and dog I and an oscillating movement to the lever K; and since the lever K is in connection with the reciprocating bar M, a motion is imparted to said bar by said lever only in a direction opposite to the movement of the bar J. This movement of bar M gives a rotating motion to the disk in hopper N'. Now, as the hammer H comes around to the front of the wheel C it strikes the dog I on part T and throws it back to its original position, and bar J, lever K, and reciprocating bar M move in opposite directions to what was before transmitted to them by the hammer H', giving a rotating movement to the seed-disk in hopper N; hence by this continued action of the hammers H and H' the reciprocating bar M is vibrated at regular intervals, causing the seed to drop regularly.

It is evident from this construction that one of the driving-wheels cannot rotate with greater velocity than the other when they are geared together, as before explained, or, in other words, when the machine is planting corn. Now, this being the case, should one wheel fall into a hollow it cannot rotate faster than the one on level ground, but will slide or rotate in the air, and the drop of corn will always be governed by the wheel on level ground. This could not be the case if the wheels were not geared together, because if the governing-wheel followed the bottom of the hollow the corn would be deposited sooner, and if said wheel should be carried over the hollow without touching the ground the deposit of corn would be later, and the slightest irregularity in one or two deposits would throw the whole row out of line.

When the machine has reached the end of a line, and it is desired to turn it around without depositing corn, the end of the lever Q, in the rear of the standard R, is thrown out by the foot of the operator, which throws the opposite end of the lever, and also the pinion E', in, by which the two wheels C C' are free to move independently of each other, and the machine can turn a corner easily. The hammers H and H' would strike the dogs, as before, and were not the lever K thrown out of connection with the bar M, corn would be deposited only at irregular intervals.

To prevent the deposit of corn while the machine is turning, I cause the end of the lever Q to slide in a slot, o, in plate O, attached to the dog I', whereby said lever end is kept always in the same horizontal plane, and as it is moved to the left during the withdrawal of the pinion E' it moves in the cam-slot p in casting P, causing a vertical movement of such piece and its foot p'. The foot p', in ascending, also carries the lever K, which rests upon it, compressing the spring l, and raising the end of the lever out of its connection with the pin m in bar M. Now, the dogs I I' may be thrown from right to left, and vice versa, and no deposit of corn will take place. When the machine is in position for the next row, one of the wheels is turned around until the hammers H and H' are exactly opposite, which may be told by noticing that the mark on one wheel is in a line with the hammer on the other. When the two hammers are opposite, the lever Q is thrown out again, and the pinion E' meshes with gear D', and the piece P and foot p' are depressed, and the spring l presses the lever K down until the pin m passes through the slot in the end of said lever, and the machine is once more ready for action.

In turning a corner, should both the hammers H H' be in a line, they would strike the dogs I I' at the same instant, and unless they could give they would break something; and to overcome this they are set against strong springs c', which allow them to recede upon great pressure, and the bolt h and nut h' prevent them from projecting too far in, and allow them to be regulated to give any desired throw to the bars J and M. The bolts S and nuts s are also used to regulate the throw of said bars; but in practice it is advisable to set the throw first by the bolts S and the nuts s, and then set the hammers to correspond. When this is done the springs c' behind the hammers will never have to be compressed, and no undue strain will be put upon the mechanism.

My improvement is designed to be attached to any of the check-row corn-planters now in use.

When on the road the same disconnection of parts is required as when turning a corner.

I claim—

1. In a corn-planter, the combination-wheels C C', hammers H H', gears D D', pinions E E', shaft F, dogs I I', bar J, lever K, and reciprocating bar M, guide-piece O, and cam-piece P, having a foot, p', and lever Q, all constructed and operated in the manner and for the purpose specified.

2. In a corn-planter, wheels C C', furnished with gears D D' and hammers H H', in combination with shaft F, pinions E E', and lever Q, whereby the said hammers can be set in any position with reference to each other, substantially as set forth.

3. In a corn-planter, the combination of the bar J, lever K, spring *l*, or its equivalent, bar M, provided with a pin, *m*, cam-piece P, provided with a foot, *p'*, guide-piece O, and lever Q, substantially as described, whereby the lever K and bar M are thrown in or out of engagement.

4. The herein-described mechanism, consisting of the lever Q, guide-piece O, and cam-piece P, for throwing the lever K in and out of connection with the pin *m* on the bar M, substantially as specified.

5. In a corn-planter, the wheels C C', provided with gears D D', in combination with pinions E E', shaft F, lever Q, guide-piece O, and cam-piece P, substantially as and for the purpose specified.

6. The hammer H, bolt *h*, nut *h'*, and spring *c'*, in combination with the wheel C and dog I, substantially as and for the purpose set forth.

7. In a corn-planter, the combination of the hammers H H', dogs I I', cam-piece P, lever K, and bar J, substantially as and for the purpose set forth.

In testimony of which invention I hereunto set my hand.

JACOB W. COLLADAY.

Witnesses:
R. M. HUNTER,
ROBERT A. CAVIN.